Patented Aug. 5, 1952

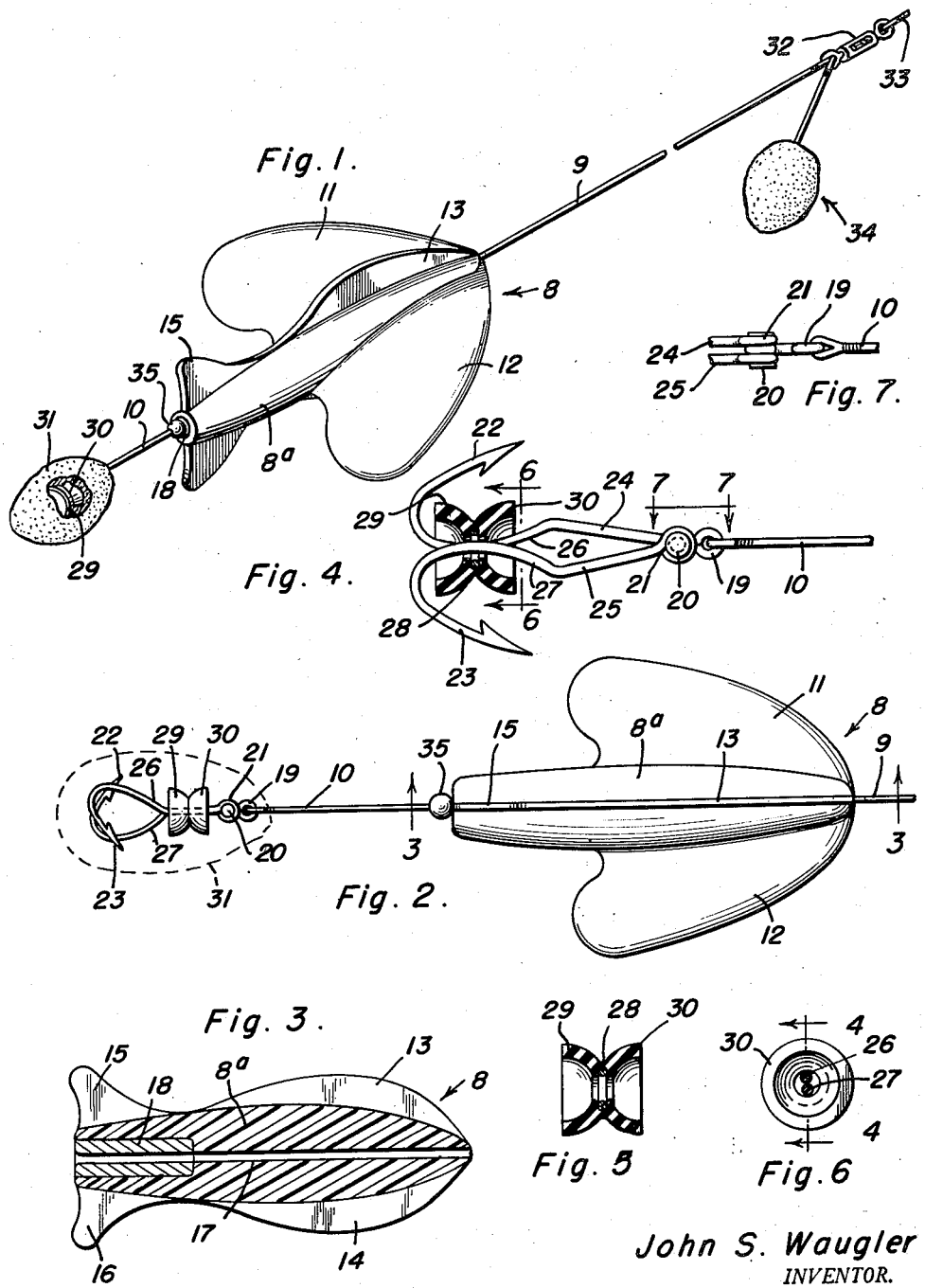

2,605,577

UNITED STATES PATENT OFFICE 2,605,577

LURE-TYPE SINKER

John S. Waugler, Pekin, Ill., assignor to Russell W. Tweedie

Application August 25, 1948, Serial No. 46,072

1 Claim. (Cl. 43—43.13)

The present invention relates to certain new and useful improvements in angler's fishing tackle and has reference, more particularly, to the combination of leader provided with novel hook means and a complemental lure-type sinker to facilitate casting and making reliable catches and to minimize the likelihood of losing any part of said tackle.

More particularly, my invention is characterized by a leader which is swivelly attached at its forward end to the fishing line and which has specially constructed hooks, preferably at its rear or trailing end, there being a fin equipped lure-type sinker on the intermediate portion of the leader, and said leader being slidable through a central bore in the sinker.

Another object of the invention has to do with the adoption and use of a lure-type sinker characterized by a dirigible-shaped plastic or equivalent body having diametrically opposite side fins, the rear end of said sinker body carrying a lead or an equivalent weight, all of said features coordinating, in a collective manner, to cause the sinker, as the line is reeled in, to ride up and travel to the surface of the water, whereby to minimize snagging of the fishing hooks on rocks and other obstacles and to thus prevent loss of the leader and the sinker and hooks carried by said leader.

A further object of the invention has to do with the provision and construction of a practical hook assembly, the latter being characterized by a pair of complemental pivotally connected hooks and slide means on the shanks of the hooks for opening and closing the hooks.

Another phase of the combination has to do with novel hook means made up of a pair of duplicate hooks with pivotally joined crossed shanks properly bent to provide cam surfaces, there being a cup equipped collar-like slide on said shanks and coacting with said cam surfaces for automatically opening and closing the hooks, depending on the direction in which the collar-like slide moves.

A still further object of the invention is to provide a sinker which has the additional function of an artificial bait or lure and has a bore through its center through which the dough baited hook carrying end of said leader is slidable, the nose of said sinker serving as a stop, when the fish picks up the dough baited hooks to make a getaway, thus resulting in checking the travel of the leader through the sinker and then serving to force the hooks to open or spread positions.

A highly important and significant object of my combination tackle arrangement pertains, as will later be seen, to the novel assemblage of two fishing hooks and featured collar, constructed along the lines stated, wherein a wad of dough, which is used as bait, may be utilized in a manner that the especially designed hooks and aforesaid slidable collar are securely encased in the dough to facilitate casting without the likelihood that the hooks will accidentally swing or spread to open position until the bait is taken by a fish.

Finally, I stress with emphasis that, due to the shaping and designing of the hooks and co-acting double cupped collar, said hooks and collar become securely lodged in the dough and insure that said dough is held intact and prevented from being easily displaced from said hooks.

Other objects and advantages will become more readily apparent from the following description and the accompanying illustrative drawings.

In the drawings:

Figure 1 is a perspective view of a combination accessory or fishing tackle constructed in accordance with the invention and showing the aquaplane-like sinker or lure and front and rear baited hook assemblies, the latter being each encased in a wad of dough, forming the hook concealing bait;

Figure 2 is a top plan view of the arrangement seen in Figure 1 with the dough removed and with the rear pair of hooks in their normal closed relationship;

Figure 3 is a longitudinal sectional view of the sinker on the plane of the line 3—3 of Figure 2, looking in the direction of the arrows;

Figure 4 is a longitudinal sectional view which may be said to have been taken on the plane of the line 4—4 of Figure 6 looking in the direction of the arrows, the hooks being shown "open";

Figure 5 is an enlarged longitudinal sectional view through the slidable spreading and retracting collar for the hooks;

Figure 6 is a section on the line 6—6 of Figure 4 looking in the direction of the arrows; and Figure 7 is an enlarged detail view of the assembling means for the hooks.

Referring now to the drawings by distinguishing reference numerals, the combination lure and sinker resembles a miniature aquaplane. It may be made of suitable commercial plastics, wood, or appropriate material of requisite durability and heaviness. In general top plan view, the over-all sinker is of spatulate form. It is characterized by a slender elongated body portion which is sometimes referred to as ellipsoidal in shape and, in other instances, has been amply described, it is believed, as of dirigible-shape. Said body portion is denoted by the numeral 8a and has a pointed forward end often referred to as a "nose." The rearward end is truncated and, therefore, blunt as shown. The body portion has an axial bore extending therethrough and opening through opposite ends and said bore has a counterbore at its rearward end, the main bore being denoted at 17 and the counterbore having a cylindrical, centrally bored weight 18 fitted therein as shown in Figure 3. The portion 9 of the leader 10 is slidable through bore 17. The diametrically opposite wings are denoted by the numerals 11 and 12 and these are relatively broad and are lobe-shaped in general configuration. It will be noticed that the outer marginal or curvate edges of these wings gradually merge into and are flush with the nose. The rearward ends of the wings are spaced from the rearward end of the body portion. If desired, the upper and lower surfaces of the wings may be suitably cambered. Rising vertically from the top of the body between the wings is a narrow dorsal fin 13 which extends to and merges with a suitable upstanding tail member 15. On the ventral or belly portion of the body is a depending, correspondingly narrow fin 14. This is diametrically opposite to the fin 13 and the extension or continuation of the rear end thereof provides a second tail member 16. These tail members and fins properly disposed about the periphery of the body insure proper operation as is obvious.

The left-hand end of leader 10, as shown in Figure 4, is attached to an eye 19 carried by a double headed pin 20 (see Figure 7) which pin serves to accommodate attaching and hinging eyes 21 on a pair of duplicate fish hooks. The hooks proper are denoted by the numerals 22 and 23 and are duplicates of one another and the shank portions are of general V-shaped form with the companion portions converging as at 24 and 25 on the one hand and 26 and 27 on the other hand. These bent shanks provide cams and the shanks are adapted to cause one another to be either spread apart or pressed together by the action of the collar-type slide, as shown. The collar or slide means comprises a ring 28 embedded in a rubber sleeve having oppositely facing rubber cups 29 and 30. When the collar is in the position shown in Figure 4 it acts on the bends 26 and 27 to spread or "cam" the hooks 22 and 23 apart to make a catch. On the other hand, when the collar is on the bends or portions 24 and 25 of the shanks as shown in Figure 2 said collar serves to "cam" the shanks together and also to close the hooks 22 and 23. Normally, the hooks are closed and the collar is at the place indicated in Figure 3 and the collar and hooks are held in this relationship by a wad or ball of bait-dough 31. This ball of dough serves to maintain the parts in relatively fixed relationship with the hooks closed but in readiness to be spread apart to make a catch. The dough also facilitates casting the line out and thus the dough combined with the hooks and collar provided a novel hook assembly. The latter is closely associated and combined with the lure-sinker 8 and the leader which carries the latter is slidable rearwardly, to the left in the drawings.

At this stage, I direct attention to a swivel-type coupling device 32 (see Figure 1) which affords a connection between the leader 9 and the fishing line 33. The numeral 34 designates another hook unit or assembly which corresponds to the one already described. This is carried on an auxiliary leader which is attached to one eye of the swivel coupling. This means 34 is optional and is not described in detail since I desire to stress the fact that the novelty had to do with the tackle characterized by a leader, the weighted lure-sinker on the intermediate portion of the leader resting against a ball-check 35 at the rear. The lure-sinker is thus about one inch or so ahead of the complemental hook means and the leader is slidable through the bore in the sinker. Thus, as stated, when the fish takes hold of the baited hook means and carries it along, the swivel unit 32 "bangs" or strikes with a blow against the nose of the fin equipped lure-sinker and this serves to "spring" the hooks and make the catch.

Experience has shown, with the use of experimental models, that my fishing tackle, which I consider made up of the leader, hooks on the end of the leader and the associated aquaplane-type lure-sinker, is feasible and highly practical. It is easy for the angler to make long and accurate casts and the hook equipped end of the line is then properly suspended in the water with the hooks depending into the water in readiness to attract and snare a desirable catch. In flight, the hooks constituting the bait, will not open but will be ready to open once the bait is taken by the fish. Any pull which is sufficient to actuate the slidable collar on the shanks of the hooks will serve to slide the collar in relation to the shanks and will open and spread the hooks and thus render same effective to make the desired catch. Fishermen will, of course, better appreciate the invention and attainable results after actually using same.

Not only do I attach importance to the combination of the essential parts and details referred to, but feel that the special designing of the fish hooks and the two cupped collar on said hooks affords the user requisite facilities for good dough baiting results. Thus, the wad of dough keeps the hooks closed (see Figure 2) and the cups provide a reliable core which insures that the dough will remain intact and securely in place until taken by a fish. Further, and at the latter stage, the action is such that the hooks are readily spread apart to make the wanted catch.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

A substantially snag-proof combination lure and sinker comprising a one-piece body embodying a slender elongated body portion substantially ellipsoidal in shape, said body portion having a pointed forward end constituting a nose, and a blunt truncated rearward end, said body portion having an axial bore opening through its opposite ends, and said bore having a counter-bore at its rearward end, a centrally bored weight mounted in said counter-bore, said body also having integral relatively broad pectoral fins projecting horizontally from diametrically opposite sides of said body portion, said fins having gradually narrowing forward portions and curvate marginal edges merging into said nose, said fins ranging in length from said nose to the mid-portion of said body portion and the rear ends of said fins being wide, lobe-shaped and being spaced forwardly from the rear end of said body portion, a dorsal fin mounted atop the median part of said body portion, and a ventral fin attached to and depending from the underside of said body portion, said dorsal and ventral fins being diametrically opposite one another and of lengths commensurate with the length of said body portion, said dorsal and ventral fins being at right angles to said pectoral fins and relatively narrow and the rear ends constituting tail members substantially flush with said blunt rearward end and being spaced rearwardly from the lobe-shaped ends of said pectoral fins.

JOHN S. WAUGLER.

REFERENCES CITED

The following references are of record in the file of this patent:

UNITED STATES PATENTS

| Number | Name | Date |
| --- | --- | --- |
| D. 149,238 | Vaars | Apr. 6, 1948 |
| 360,339 | Cooke | Mar. 29, 1887 |
| 449,519 | Carswell | Mar. 31, 1891 |
| 1,188,583 | Townsend | June 27, 1916 |
| 1,316,040 | Jamison | Sept. 16, 1919 |
| 1,612,264 | Cressey | Dec. 28, 1926 |
| 1,701,444 | Darr | Feb. 5, 1929 |
| 1,766,532 | Pflueger | June 24, 1930 |
| 1,778,065 | Davenport | Oct. 14, 1930 |
| 2,176,820 | McConnell | Oct. 17, 1939 |
| 2,350,650 | Titus | June 6, 1944 |
| 2,473,644 | Groza | June 21, 1949 |